United States Patent
Lee et al.

(10) Patent No.: US 10,197,854 B2
(45) Date of Patent: Feb. 5, 2019

(54) LIQUID CRYSTAL DISPLAY DEVICE

(71) Applicant: SAMSUNG DISPLAY CO., LTD., Yongin-Si, Gyeonggi-Do (KR)

(72) Inventors: Hyunwoo Lee, Anyang-si (KR); Donghoon Kim, Suwon-si (KR); Kang-woo Lee, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/427,552

(22) Filed: Feb. 8, 2017

(65) Prior Publication Data
US 2017/0329168 A1 Nov. 16, 2017

(30) Foreign Application Priority Data

May 12, 2016 (KR) .................... 10-2016-0058376

(51) Int. Cl.
*G02F 1/133* (2006.01)
*G02F 1/1335* (2006.01)
*F21V 8/00* (2006.01)

(52) U.S. Cl.
CPC ....... *G02F 1/13362* (2013.01); *G02B 6/0053* (2013.01); *G02B 6/0056* (2013.01); *G02F 1/133528* (2013.01); *G02F 2001/133531* (2013.01); *G02F 2001/133607* (2013.01); *G02F 2001/133614* (2013.01); *G02F 2202/02* (2013.01); *G02F 2202/28* (2013.01)

(58) Field of Classification Search
None
See application file for complete search history.

(56) References Cited

U.S. PATENT DOCUMENTS 6,337,111 B1 * 1/2002 Ichihashi ............. C09K 19/601
252/299.1
2015/0286096 A1 10/2015 Kim et al.
2016/0154275 A1 * 6/2016 Saneto ................... G02B 5/26
349/114

FOREIGN PATENT DOCUMENTS

| JP | 2001174636 A | 6/2001 |
| KR | 1020130046495 A | 5/2013 |
| KR | 1020150040608 A | 4/2015 |
| KR | 101518734 B1 | 5/2015 |
| KR | 101533106 B1 | 6/2015 |

OTHER PUBLICATIONS

M. Yoosuf Ameen, et al., "Linearly polarized emission from PTCDI-C8 one-dimensional microstructures," Organic Electronics, vol. 14 (2013) pp. 554-559.

* cited by examiner

*Primary Examiner* — James Dudek
(74) *Attorney, Agent, or Firm* — Cantor Colburn LLP (57) ABSTRACT

A liquid crystal display device includes a backlight unit and a liquid crystal display panel disposed on the backlight unit, wherein the backlight unit includes a light source unit and a plurality of optical sheets, wherein an optical sheet closest to the liquid crystal display panel among the plurality of optical sheets is a polarizing optical sheet and includes a base film and an optical pattern disposed on a surface of the base film, wherein at least one of the base film and the optical pattern includes an aligned organic fluorescent material.

15 Claims, 10 Drawing Sheets

LIQUID CRYSTAL DISPLAY DEVICE

This application claims priority to Korean Patent Application No. 10-2016-0058376, filed on May 12, 2016, and all the benefits accruing therefrom under 35 U.S.C. § 119, the entire content of which in its entirety is herein incorporated by reference.

BACKGROUND

Field

The present disclosure relates to a liquid crystal display device, and more particularly, to a liquid crystal display device in which a backlight unit includes an optical sheet containing an aligned organic fluorescent material.

Description of the Related Art

With the arrival of the information society, display devices are becoming more important as visual information delivery media. Existing display devices include a liquid crystal display (LCD), a plasma display panel (PDP), an organic light emitting display (OLED), a field effect display (FED), an electrophoretic display (EPD), etc.

A liquid crystal display device includes a liquid crystal display panel in which a liquid crystal layer is interposed between a lower substrate and an upper substrate, and first and second polarizing plates may be provided to an outer surface of each of the substrates, respectively.

Up to about 50% of the light provided from a backlight unit may be lost as the light passes through the first polarizing plate provided on the outer side surface of the lower substrate.

For this reason, a liquid crystal display device has low luminous efficiency, and consumes a relatively high amount of power in order to have excellent luminance.

SUMMARY

The present disclosure provides a liquid crystal display device with improved luminous efficiency and low power consumption.

An embodiment provides a liquid crystal display device including: a backlight unit; and a liquid crystal display panel disposed on the backlight unit, wherein the backlight unit includes: a light source unit; and a plurality of optical sheets, wherein an optical sheet closest to the liquid crystal display panel among the plurality of optical sheets is a polarizing optical sheet and includes: a base film; and an optical pattern disposed on a surface of the base film, wherein at least one of the base film and the optical pattern includes an aligned organic fluorescent material.

In an embodiment, the liquid crystal display panel may include: a first substrate; a second substrate disposed on the first substrate; a polarizing plate disposed on the second substrate; and a liquid crystal layer disposed between the first substrate and the second substrate.

In an embodiment, the first substrate may include an upper surface and a lower surface which are facing each other, wherein the lower surface may be exposed to an outside of the liquid crystal display panel.

In an embodiment, the optical pattern includes the organic fluorescent material.

In an embodiment, the base film includes the organic fluorescent material.

In an embodiment, the light source unit may include an unpolarized light source.

In an embodiment, the organic fluorescent material may include a structure having a long axis and a short axis, wherein the long axis may be aligned in a first direction.

In an embodiment, the organic fluorescent material may have a polarity.

In an embodiment, a method for manufacturing a liquid crystal display device includes: providing a backlight unit including a light source unit and a plurality of optical sheets; and providing a liquid crystal display panel on the backlight unit, wherein the backlight unit includes a polarizing optical sheet among the plurality of optical sheets, and including a base film and an optical pattern disposed on a surface of the base film, wherein at least one of the base film and the optical pattern includes an aligned organic fluorescent material, wherein the providing of the liquid crystal display panel includes disposing the liquid crystal display panel on the backlight unit such that the liquid crystal display panel is closest to the polarizing optical sheet among the plurality of optical sheets.

In an embodiment, the polarizing optical sheet may be prepared by: forming the base film including the aligned organic fluorescent material; and forming the optical pattern on the surface of the base film.

In an embodiment, the forming the base film including the aligned organic fluorescent material may include: providing a resin composition on a substrate; providing an organic fluorescent material in the resin composition using a mask in which a plurality of openings are defined, wherein the plurality of openings are spaced apart from each other in a first direction and the plurality of openings extend in a second direction which is perpendicular to the first direction; and curing the resin composition provided with the organic fluorescent material.

In an embodiment, the forming the base film including the aligned organic fluorescent material includes: curing a resin composition including an organic fluorescent material to form the base film; and stretching the base film to align the organic fluorescent material.

In an embodiment, the forming the polarizing optical sheet includes: preparing the base film; and forming the optical pattern including the aligned organic fluorescent material on the surface of the base film.

In an embodiment, the forming the optical pattern may include: providing a resin composition including an organic fluorescent material having a polarity on the surface of the base film; applying at least one selected from an electric field and a magnetic field to the resin composition to align the organic fluorescent material; and curing the resin composition.

In an embodiment, the method may further include preparing the liquid crystal display panel prior to the providing of the liquid crystal display panel on the backlight unit, wherein the liquid crystal display panel includes a first substrate, a second substrate disposed on the first substrate, a polarizing plate disposed on the second substrate, and a liquid crystal layer disposed between the first substrate and the second substrate.

In an embodiment, the providing the liquid crystal display panel to the backlight unit may include disposing the first substrate such that the first substrate is closer to the backlight unit than the second substrate.

BRIEF DESCRIPTION OF THE DRAWINGS

The accompanying drawings are included to provide a further understanding and are incorporated in and constitute a part of this specification. The drawings illustrate exemplary embodiments and together with the description, serve to explain principles. In the drawings.

DETAILED DESCRIPTION

Exemplary embodiments will be described below in more detail with reference to the accompanying drawings, in which various embodiments are shown. The present disclosure may, however, be embodied in different forms and should not be construed as limited to the embodiments set forth herein. Rather, these embodiments are provided so that this disclosure will be thorough and complete, and will fully convey the scope to those skilled in the art.

Like reference numerals refer to like elements throughout. In the accompanying drawings, the dimensions of structures are exaggerated for clarity of illustration. The terms "first," "second," "third," and the like may be used for describing various elements, components, regions, layers and/or sections, but the elements, components, regions, layers and/or sections should not be construed as being limited by the terms. Such terms are only used for distinguishing one element, components, region, layer, and/or sections from other elements, components, regions, layers and/or sections. For example, "a first element," "component," "region," or "section" could be termed a second element, component, region, or section, without departing from the teachings herein.

The terminology used herein is for the purpose of describing particular embodiments only and is not intended to be limiting. The terms of a singular form may include plural forms unless otherwise specified. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items.

It will be further understood that the terms "comprises" and/or "comprising," or "includes", "including", "has", "having", and the like, when used in this specification, specify the presence of stated features, integers, steps, operations, elements, and/or components, but do not preclude the presence or addition of one or more other features, integers, steps, operations, elements, components, and/or groups thereof. Furthermore, when a layer, a film, a region or a plate is referred to as being "on" another part, it can be directly on the other part, or intervening parts may also be present. Likewise, when a part such as a layer, a film, an area, a plate, or the like is referred to as being "under" another part, it can be directly under the other part or intervening parts may be present.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a liquid crystal display device according to an embodiment will be described.

Figure 1:
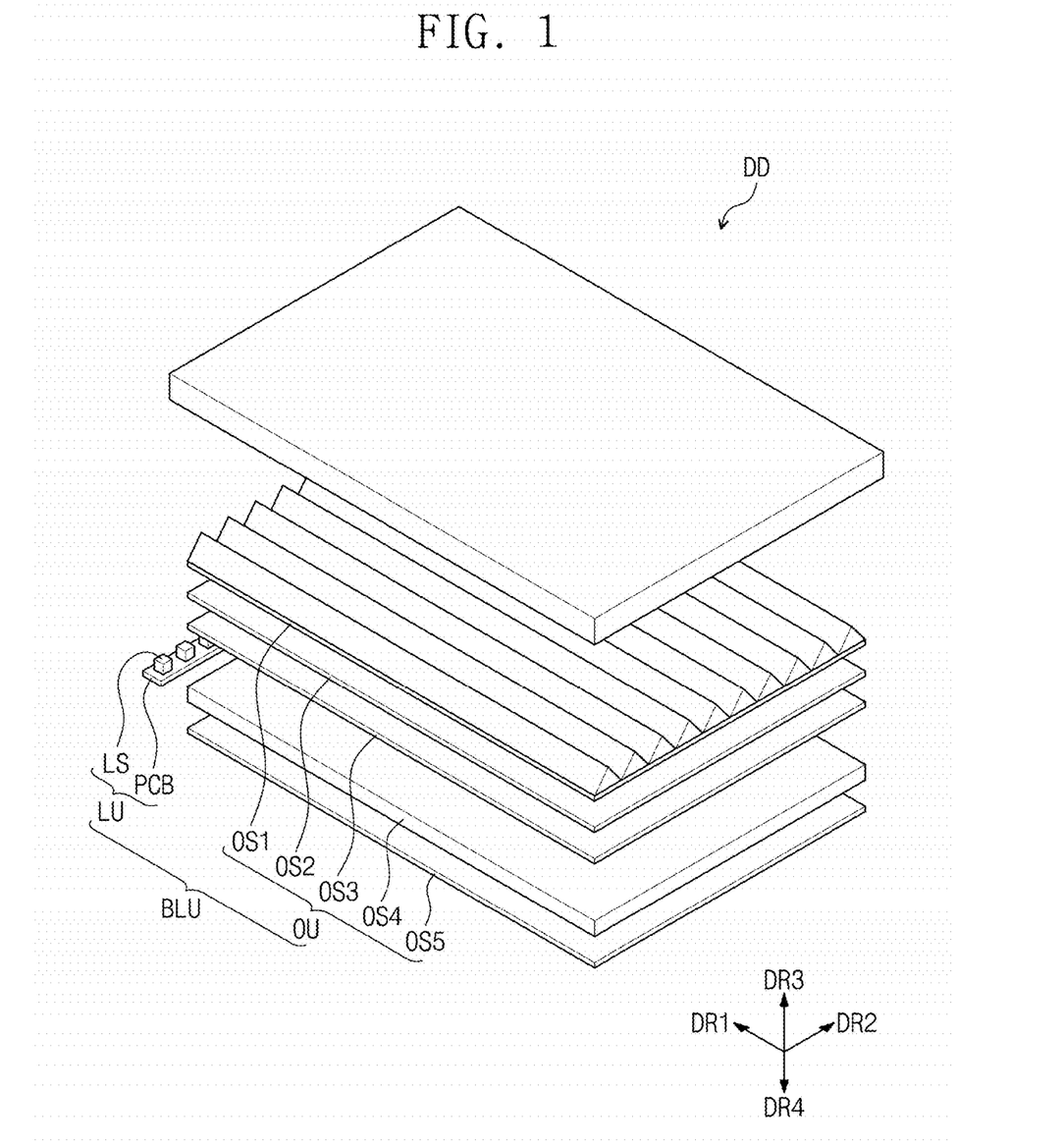
FIG. 1 is an exploded perspective view schematically illustrating a liquid crystal display device according to an embodiment.
Figure 2:
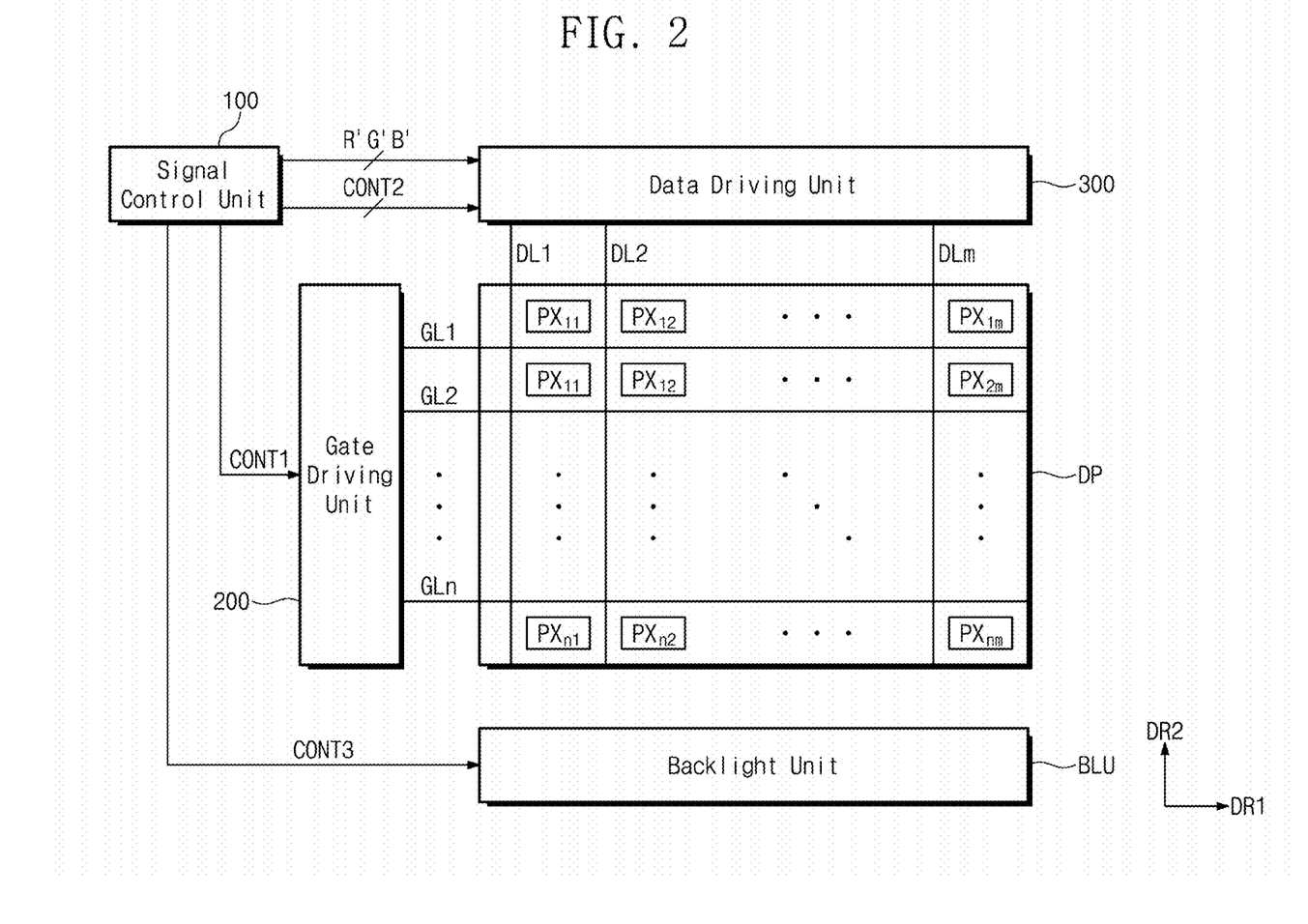
FIG. 2 is a block diagram illustrating a liquid crystal display device according to an embodiment.

FIG. 1 is an exploded perspective view schematically illustrating a liquid crystal display device according to an embodiment. FIG. 2 is a block diagram illustrating a liquid crystal display device according to an embodiment.

Referring to FIGS. 1 and 2, a liquid crystal display device DD according to an embodiment includes a liquid crystal display panel DP, a signal control unit 100, a gate driving unit 200, a data driving unit 300, and a backlight unit BLU.

The liquid crystal display panel DP is disposed on the backlight unit BLU. The liquid crystal display panel DP and the backlight unit BLU may be spaced apart from each other.

The liquid crystal display panel DP includes a plurality of signal wirings and a plurality of pixels PX11 to PXnm connected thereto. The plurality of signal wirings includes a plurality of gate lines GL1 to GLn and a plurality of data lines DL1 to DLm. The plurality of gate lines GL1 to GLn extend in a first direction DR1 and are arranged in a second direction DR2. The plurality of data lines DL1 to DLm insulatively intersects the plurality of gate lines GL1 to GLn.

The plurality of gate lines GL1 to GLn and the plurality of data lines DL1 to DLm may define pixel regions, each of which may be provided with a pixel for displaying an image. The plurality of pixels PX11 to PXnm may be arranged in a matrix form. Each of the pixels PX11 to PXnm is connected to a corresponding gate line amongst the plurality of gate lines GL1 to GLn and to a corresponding data line amongst the plurality of data lines DL1 to DLm.

The signal control unit 100 receives input image signals and converts the input image signals into image data R'G'B' compatible with operation of the liquid crystal display panel DP. Furthermore, the signal control unit 100 receives various control signals such as a vertical synchronization signal, a horizontal synchronization signal, a main clock signal, and a data enable signal, and outputs first and second control signals CONT1 and CONT2. Furthermore, the signal control unit 100 outputs a third control signal CONT3 for controlling the backlight unit BLU. The third control signal CONT3 may include a dimming signal.

The gate driving unit 200 outputs gate signals to the gate lines GL1 to GLn in response to the first control signal CONT1. The first control signal CONT1 includes a vertical initiation signal for initiating operation of the gate driving unit 200, a gate clock signal for determining an output time of a gate voltage, and an output enable signal for determining an "on" pulse width of the gate voltage.

The data driving unit 300 receives the second control signal CONT2 and the image data R'G'B'. The data driving unit 300 converts the image data R'G'B' into data voltages, and provides the data voltages to the data lines DL1 to DLm.

The second control signal CONT2 includes a horizontal initiation signal for initiating operation of the data driving unit 300, a reversal signal for reversing polarities of the data voltages, and an output indication signal for determining times for outputting the data voltages from the data driving unit 300.

The backlight unit BLU provides light to the liquid crystal display panel DP in response to the third control signal CONT3. The backlight unit BLU includes a light source unit LU and an optical unit OU including a plurality of optical sheets OS1 to OS5. The optical sheet OS5 which is closest to the liquid crystal display panel DP among the optical sheets OS1 to OS5 is a polarizing optical sheet capable of performing a polarizing function. The polarizing optical sheet OS1 is described in more detail below.

Although FIG. 1 illustrates that the optical unit OU includes five optical sheets, an embodiment is not limited thereto, and as desired, one or more optical sheets may be omitted or an additional optical sheet may be added. Furthermore, a plurality of overlapping identical optical sheets may be used.

The optical unit OU, for example, may include a light guide plate OS4 which is disposed at one side of the light source unit LU and emits light provided from the light source unit LU towards the liquid crystal display panel DP, a reflective sheet OS5 which is disposed under the light guide plate OS4 and changes a path of light deviating from a direction to the liquid crystal display DP such that the light progresses towards the liquid crystal display panel DP, a diffusion sheet OS3 which is disposed on the light guide plate OS4 and diffuses light emitted from the light guide plate OS4, and first and second prism sheets OS2 and OS1 which are sequentially arranged on the diffusion sheet OS3 and which concentrate diffused light.

Optical sheets are not limited to the above-mentioned example. For example, the liquid crystal display device DD according to an embodiment may include one prism sheet and may further include a protective sheet for protecting the prism sheet from an external shock.

Although FIG. 1 exemplarily illustrates the edge-type backlight unit BLU, an embodiment is not limited thereto. The liquid crystal display device DD according to an embodiment may include a direct-type backlight unit BLU in which the light source unit LU is disposed on a reflective sheet, and a diffusion sheet, a prism sheet, etc. are sequentially arranged on the light source unit LU.

Figure 3:
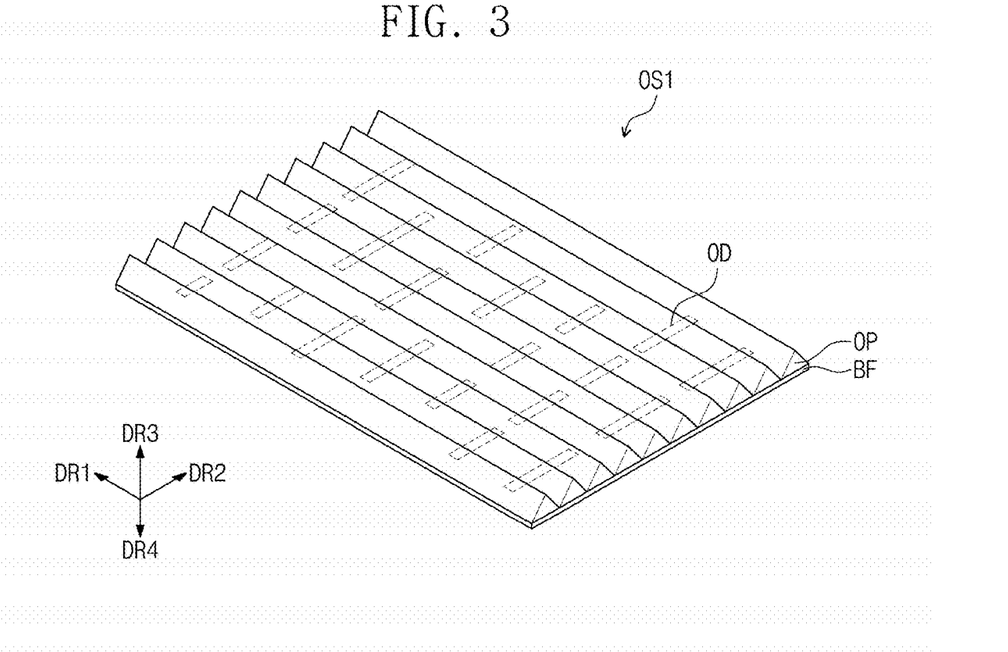
FIG. 3 is a schematic perspective view illustrating a polarizing optical sheet of a liquid crystal display device according to an embodiment.
Figure 4:
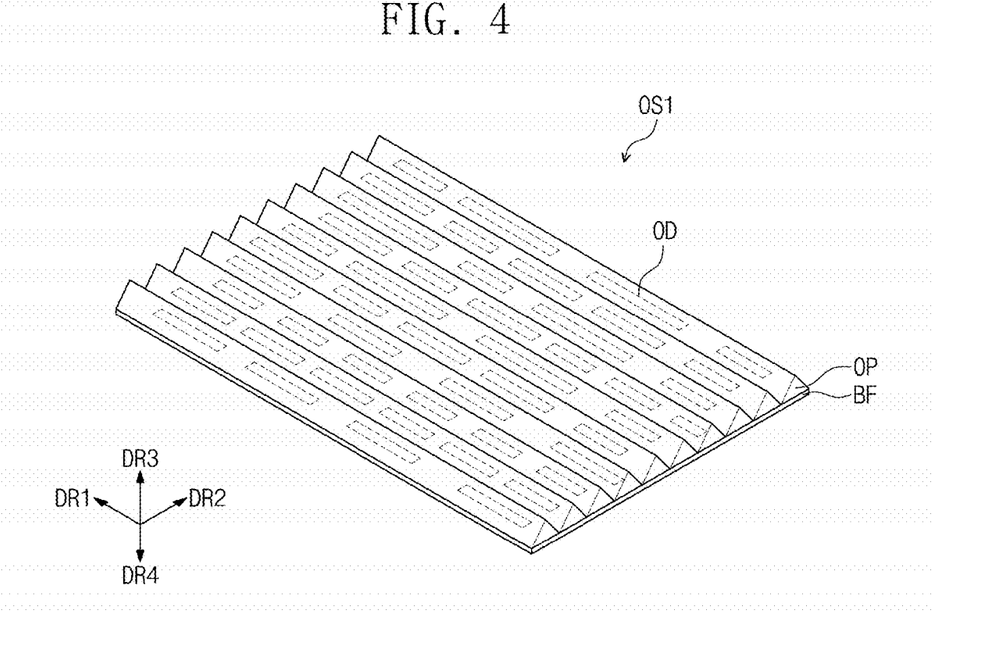
FIG. 4 is a schematic perspective view illustrating a polarizing optical sheet of a liquid crystal display device according to another embodiment.
Figure 5:
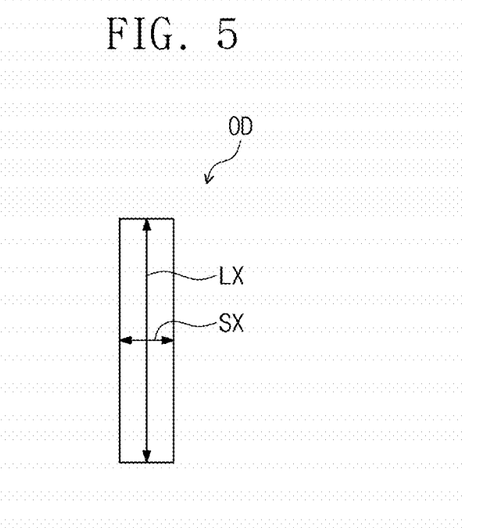
FIG. 5 is a schematic diagram illustrating a structure of an organic fluorescent material of a liquid crystal display device according to an embodiment.

FIG. 3 is a schematic perspective view illustrating a polarizing optical sheet of a liquid crystal display device according to an embodiment. FIG. 4 is a schematic perspective view illustrating a polarizing optical sheet of a liquid crystal display device according to an embodiment. FIG. 5 is a schematic diagram illustrating a structure of an organic fluorescent material of a liquid crystal display device according to an embodiment.

Referring to FIGS. 3 to 5, as described above, the optical sheet OS1 which is closest to the liquid crystal display panel DP among the optical sheets OS1 to OS5 is a polarizing optical sheet including an oriented organic fluorescent material OD. The oriented organic fluorescent material OD may represent that the organic fluorescent material OD is arranged, i.e., aligned, in one direction. In detail, the organic fluorescent material OD included in the polarizing optical sheet OS1 may have a structure including a long axis LX and a short axis SX, wherein the long axis LX is aligned in one direction. For convenience, FIGS. 4 and 5 exemplarily illustrate that the organic fluorescent material has a rectangular shape, but an embodiment is not limited thereto.

The polarizing optical sheet OS1 includes a base film BF and an optical pattern OP formed on one surface of the base film BF. The oriented organic fluorescent material OD may be included within the optical pattern OP. In this case, a polarization breakdown due to a refractive index of the optical pattern OP may be minimized. However, an embodiment is not limited to the above-mentioned example, and the oriented fluorescent material OD may be included within the base film BF or in both the base film BF and the optical pattern OP. The base film BF and the optical pattern OP may be integrated.

FIG. 3 exemplarily illustrates that the optical pattern is a prism pattern, but an embodiment is not limited thereto, and any suitable optical pattern may be used. For example, the optical pattern may have a lenticular shape.

FIG. 3 exemplarily illustrates that the optical pattern OP is formed on an upper surface of the polarizing optical sheet OS1, but an embodiment is not limited thereto, and the optical pattern OP may be formed on a lower surface of the polarizing optical sheet OS1, or may be formed on both the upper surface and the lower surface of the polarizing optical sheet OS1.

FIG. 3 exemplarily illustrates that the long axis (LX of FIG. 5) of the organic fluorescent material OD is aligned perpendicular to the direction DR1 in which the optical pattern OP extends, but an embodiment is not limited thereto. For example, referring to FIG. 4, the long axis (LX of FIG. 5) of the organic fluorescent material OD may be aligned in the direction DR1 in which the optical pattern OP extends.

The polarizing optical sheet OS1 is a multi-functional optical sheet which performs a light concentrating function, an optical recycling function, or the like, in addition to a polarizing function. An optical sheet is provided with a polarizing function so as to be used in the liquid crystal display device DD according to an embodiment, and thus an increase of a thickness of the liquid crystal display device DD does not occur in comparison with the case where an additional polarizing sheet is added.

The light provided from the light source unit LU is incident to the liquid crystal display panel DP after being polarized by the polarizing optical sheet OS1. In detail, the organic fluorescent material OD included in the polarizing optical sheet OS5 absorbs the light provided from the light source unit LU, and then emits the polarized light towards the liquid crystal display panel DP.

As described above, the polarizing optical sheet OS1 is disposed closest to the liquid crystal display panel DP among the optical sheets OS1 to OS5. That is, the polarizing optical sheet OS1 is disposed at an uppermost layer among the optical sheets OS1 to OS5. The optical sheets may include polyethylene terephthalate (PET), and when polarized light passes through a layer including PET, light polarization is broken due to the refractive index anisotropy pf PET. Therefore, in the liquid crystal display panel DD according to an embodiment, the polarizing optical sheet OS1 is disposed at an uppermost layer among the optical sheets OS1 to OS5 so as to maintain a polarized state before light is incident to the liquid crystal display panel DP.

Each of the optical sheets OS1 to OS5 may include a polymeric film, which may include, for example, at least one selected from polyethylene terephthalate, polymethyl methacrylate, polyacrylate, polycarbonate, cellulose acetate butyrate, polyvinyl chloride, polyvinyl naphthalene, epoxy, polyimide, and polyethylene. However, an embodiment is not limited to the above-mentioned examples, and any material which is suitable for the optical sheets OS1 to OS5 may be used. The polarizing optical sheet OS1 may include the organic fluorescent material OD in an amount of from at least about 0.1 weight percent (wt %) to less than about 100 wt %, based on the total weight of the polarizing optical sheet OS1. When the amount of the organic fluorescent material OD is less than about 0.1 wt %, the effect of emission of light by the organic fluorescent material OD is low.

Any organic fluorescent material may be used as the organic fluorescent material OD. The organic fluorescent material OD may be an organic material which may be excited by light to emit light. The organic fluorescent material OD, for example, may have a conjugation structure. Due to the conjugation structure, the organic fluorescent materials OD may agglomerate in a certain direction by virtue of π-π stacking, so that polarized light may be emitted through excitation.

For example, the organic fluorescent material OD may include at least one selected from the compounds shown below, but an embodiment is not limited thereto.

For another example, the organic fluorescent material OD may include poly(9,9-dioctylfluorene), poly(9,9-di(ethylhexyl)fluorene), poly(9,9-dioctylfluorene-co-benzothiadiazole), poly(9,9-dioctylfluorene-co-dithiophene), or the like.

The organic fluorescent material OD may have a polarity. In this case, the organic fluorescent material OD may be aligned in one direction by providing a magnetic field and/or an electric field. However, an embodiment is not limited to the above-mentioned example, and the organic fluorescent material OD may be a non-polar material.

The light source unit LU includes a printed circuit board PCB and a light source LS disposed on a surface of the printed circuit board PCB. The light source LS may be mounted on the surface of the printed circuit board PCB using any suitable method. The printed circuit board PCB supplies power to the light source LS. Any printed circuit board PCB may be used, and for example, the printed circuit board PCB may be a flexible printed circuit board (FPBC) including a resin layer.

The light source LS, for example, may be a light emitting diode (LED). The light source LS may be provided in a plurality, and may be arranged on a printed circuit board PBC in the second direction DR2 so as to be spaced apart from each other. The light source unit LU may be an LED chip or an LED package. For example, each LED may be contained in a case used as a housing.

The light source unit LU may include an unpolarized light source LS. Since the optical sheet OS1 which is closest to the liquid crystal display panel DP performs a polarizing function, the unpolarized light source LS, instead of the polarized light source LS, is applicable to the liquid crystal display device DD according to an embodiment.

Figure 6:
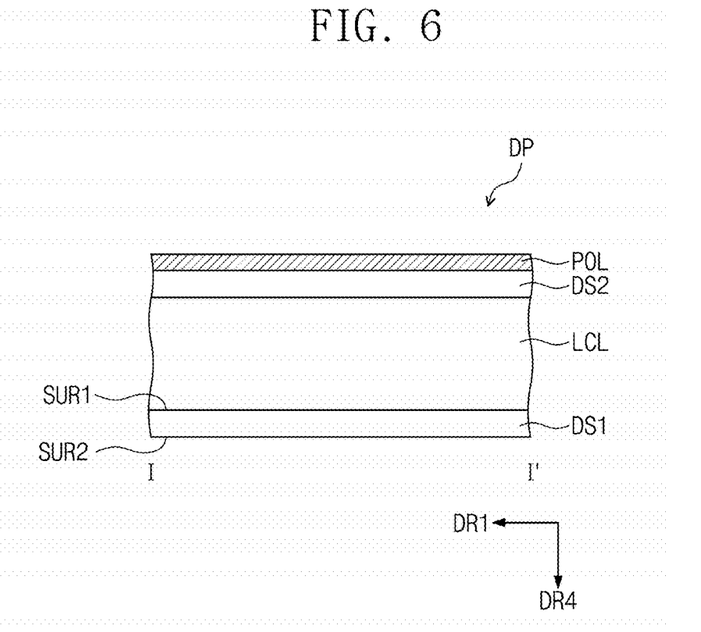
FIG. 6 is a cross-sectional view illustrating the liquid crystal display panel taken along line I-I' of FIG. 1.

FIG. 6 is a cross-sectional view illustrating the liquid crystal display panel taken along line I-I' of FIG. 1.

Referring to FIGS. 1 and 6, the liquid crystal display panel DP includes a first substrate DS1, a second substrate DS2 disposed on the first substrate DS1, and a liquid crystal layer LCL disposed between the first substrate DS1 and the second substrate DS2. A polarizing plate POL is disposed on the second substrate DS2.

The first substrate DS1 and the second substrate DS2 may be spaced apart from each other in a thickness direction DR4. Although not illustrated in the drawing, a sealant may bond the first substrate DS1 and the second substrate DS2.

A cell gap between the first substrate DS1 and the second substrate DS2 may be determined by the thickness of the sealant.

The first substrate DS1 may be provided with a thin-film transistor (not shown) and a pixel electrode (not shown). The second substrate DS2 may be provided with a color filter (not shown) and a transparent common electrode (not shown). However, an embodiment is not limited to the above-mentioned example, and a color filter may be provided to the first substrate DS1.

Any substrate or any liquid crystal layer suitable for use in a liquid crystal display may be used as the first and second substrates DS1 and DS2 or the liquid crystal layer LCL, respectively.

Furthermore, any suitable polarizing plate may be used as the polarizing plate POL. For example, the polarizing plate POL may include a polyvinyl alcohol-based polarizer.

Figure 7:
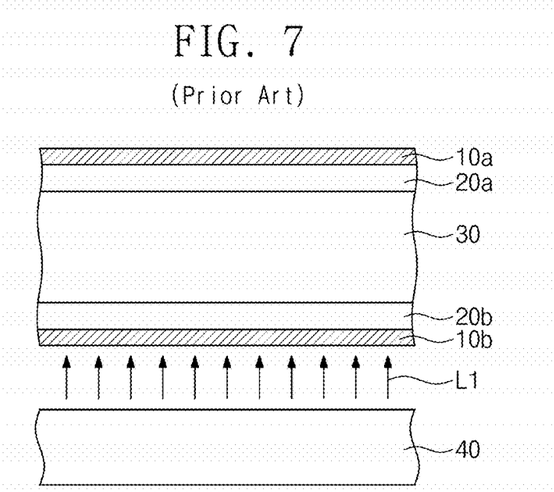
FIG. 7 is a schematic cross-sectional view illustrating a liquid crystal display device of the prior art.

FIG. 7 is a schematic cross-sectional view illustrating a liquid crystal display device of the prior art.

Referring to FIG. 7, a liquid crystal display device has a structure in which an upper substrate 20a and a lower substrate 20b are bonded to face each other with a liquid crystal layer 30 therebetween. An upper polarizing plate 10a is disposed on an outer surface of the upper substrate 20a, and a lower polarizing plate 10b is disposed on an outer surface of the lower substrate 20b. The upper polarizing plate 10a and the lower polarizing plate 10b are arranged so that polarizing axes thereof perpendicularly intersect.

Light provided from a backlight unit 40 is transmitted by the lower polarizing plate 10b so that only light polarized in one direction is incident to the liquid crystal layer 30, and then the light is transmitted by the upper polarizing plate 10a so as to be incident to an eye of a user to display an image.

Referring back to FIG. 6, the liquid crystal display device DD according to an embodiment may have a structure in which a lower polarizing plate which is typically disposed on a lower surface SUR2 of the first substrate DS1 is not present. By providing the polarizing optical sheet OS1 to the backlight unit BLU of the liquid crystal display device DD according to an embodiment, the lower polarizing plate of the liquid crystal display panel DP may not be provided in the liquid crystal display device DD.

The first substrate DS1 is disposed closer to the backlight unit BLU than the second substrate DS2. The first substrate DS1 includes an upper surface SUR1 and a lower surface SUR2 facing each other. A distance between the lower surface SUR2 of the first substrate DS1 and the backlight unit BLU is smaller than a distance between the upper surface SUR1 of the first substrate DS1 and the backlight unit BLU. The lower surface SUR2 of the first substrate DS1 may be exposed to the outside of the liquid crystal display device. Thus, only an air layer may be disposed between the lower surface SUR2 of the first substrate DS1 and the polarizing optical sheet OS1.

Figure 8:
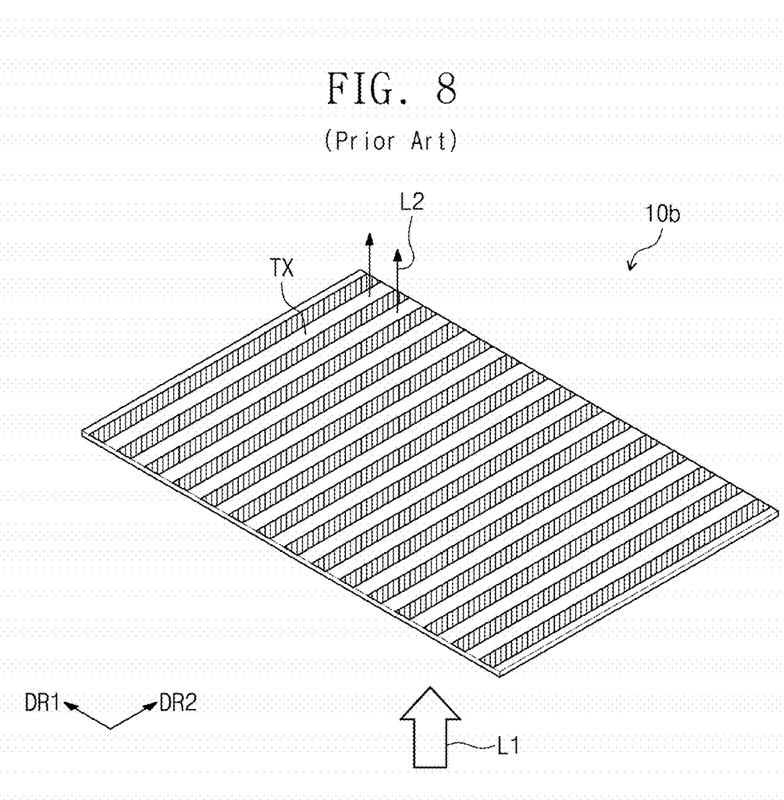
FIG. 8 is a diagram illustrating that light provided from a backlight unit of a liquid crystal display device of the prior art is transmitted by a lower polarizing plate.

FIG. 8 is a diagram illustrating that light provided from a backlight unit of a liquid crystal display device of the prior art, is transmitted by a lower polarizing plate.

Referring to FIG. 8, in the case of the liquid crystal display device of the prior art, about 50% of the total amount of light L1 provided by the backlight unit 40 is lost as the light L1 passes through the lower polarizing plate 10b. In detail, when the light L1 provided from the backlight unit 40 passes through the lower polarizing plate 10b, only light L2 aligned with a transmission axis of the lower polarizing plate 10b is transmitted, and as a result, only up to about 50% light may be transmitted by the lower polarizing plate 10b.

Figure 9:
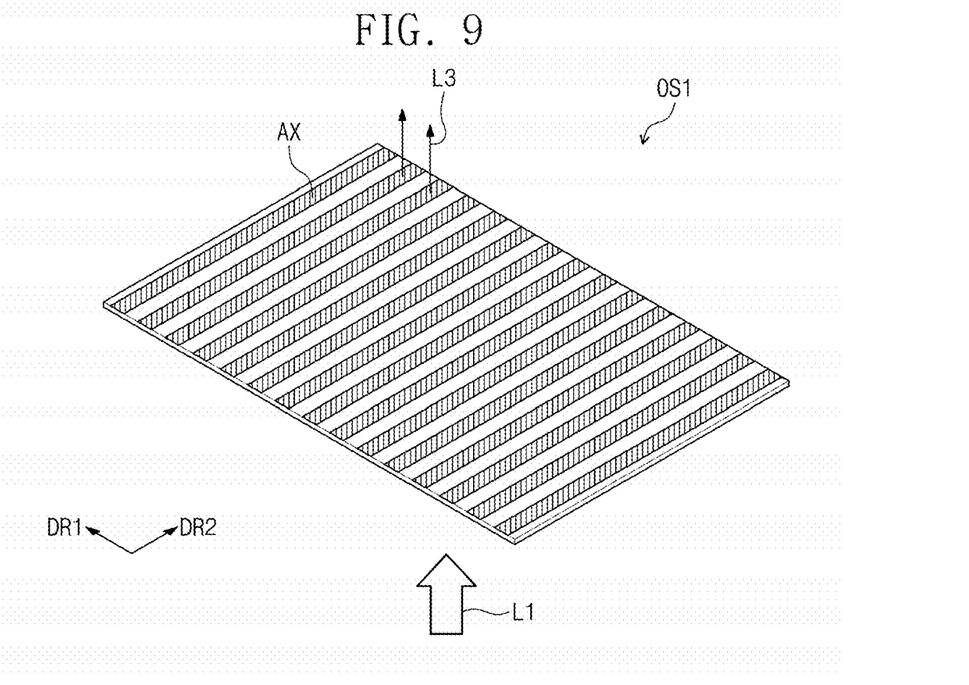
FIG. 9 is a diagram illustrating that light provided from a backlight unit of a liquid crystal display device according to an embodiment is transmitted by a polarizing optical sheet.

FIG. 9 is a diagram illustrating that light provided from a backlight unit of a liquid crystal display device according to an embodiment is transmitted by a polarizing optical sheet.

Referring to FIG. 9, in comparison with a prior art liquid crystal display device, light provided from the light source unit LU is polarized not in a lower polarizing plate (10b of FIG. 7) but in the polarizing optical sheet OS1 included in a backlight unit (BLU of FIG. 1) in the liquid crystal display device DD according to an embodiment. In detail, the organic fluorescent material OD included in the polarizing optical sheet OS1 absorbs the light L1 provided from the light source unit LU, and then emits polarized light L3 towards the liquid crystal display panel DP. For convenience, FIG. 9 exemplarily illustrates that the organic fluorescent material OD is oriented to form one axis AX, but an embodiment is not limited thereto. Since the organic fluorescent material OD is oriented in the polarizing optical sheet OS1, the light L3 emitted from the organic fluorescent material OD has a polarized characteristic per se. Since light is polarized using the polarizing optical sheet OS1 in which the organic fluorescent material OD is used, the amount of light which is lost prior to being provided to the liquid crystal layer LCL in the liquid crystal display device DD according to an embodiment, may be reduced in comparison with a prior art liquid crystal display device in which light is polarized using a lower polarizing plate (10b of FIG. 7). For convenience, FIG. 9 illustrates that the organic fluorescent material OD is shaped like a long rod, but an embodiment is not limited thereto.

Figure 10:
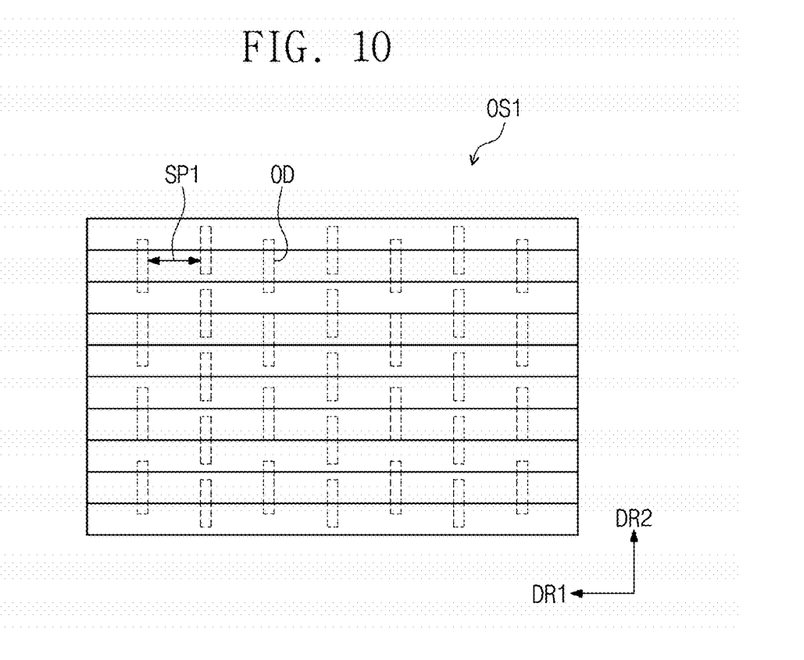
FIG. 10 is a schematic planar view illustrating a polarizing optical sheet of a liquid crystal display device, according to an embodiment.

FIG. 10 is a schematic planar view illustrating a polarizing optical sheet of a liquid crystal display device according to an embodiment.

Referring to FIGS. 5 and 10, as described above, the long axis LX of the organic fluorescent material OD is aligned in first direction (for example, DR2). The short axes SX of the organic fluorescent material OD are spaced apart from each other in a second direction DR1 which is perpendicular to the first direction (for example, DR2), so as to be arranged irregularly or regularly. A distance of separation SP1 between the short axes SX in the second direction DR which is perpendicular to the first direction (for example, DR2) may be variously adjusted, for example, may be several hundred nanometers (nm) or several micrometers (μm). For example, the separation distance SP1 may be about 10 μm or less, and when this range is satisfied, the amount of light provided from the light source unit LU which is unable to be absorbed by the organic fluorescent material OD, may be minimized, thereby improving the efficiency of light transmission.

By adding the polarizing optical sheet OS1 including the oriented organic fluorescent material OD to the backlight unit BLU of the liquid crystal display device DD according to an embodiment, a luminous efficiency of the liquid crystal display device may be improved, and a high luminance and low power consumption may be achieved. Therefore, the liquid crystal display device DD according to an embodiment does not include a polarizing light source, and a lower polarizing plate (10b of FIG. 6) of the liquid crystal display panel DP may not be provided.

Furthermore, by adopting the organic fluorescent material OD, a wide color gamut may be achieved in comparison with the case of using a quantum dot fluorescent material. In the case of using the quantum dot fluorescent material, a protective layer (barrier layer) may be provided since the quantum dot fluorescent material is vulnerable to air and moisture, and a color gamut is degraded due to the protective layer (barrier layer). However, since the organic fluorescent material OD allows the protective layer (barrier layer) to be omitted, the organic fluorescent material OD is advantageous for a wide color gamut in comparison with the quantum dot fluorescent material. Furthermore, a portion of light emitted from a quantum dot is refracted by the protective layer and thus is unable to be incident to a display panel. However, when the organic fluorescent material OD is adopted according to an embodiment, the protective layer may be omitted and the above-mentioned limitation may be overcome. Moreover, in general, the quantum dot fluorescent material contains cadmium (Cd), which is a carcinogen. However, since an embodiment adopts the organic fluorescent material OD, the above-mentioned limitation may be overcome.

Hereinafter, a method for manufacturing a liquid crystal display device according to an embodiment will be described with reference to FIGS. 11 to 16. The following description is focused on a difference from the above-mentioned liquid crystal display device DD according to an embodiment, and the above description of the liquid crystal display device DD according to an embodiment is applied to non-described parts.

Figure 11:
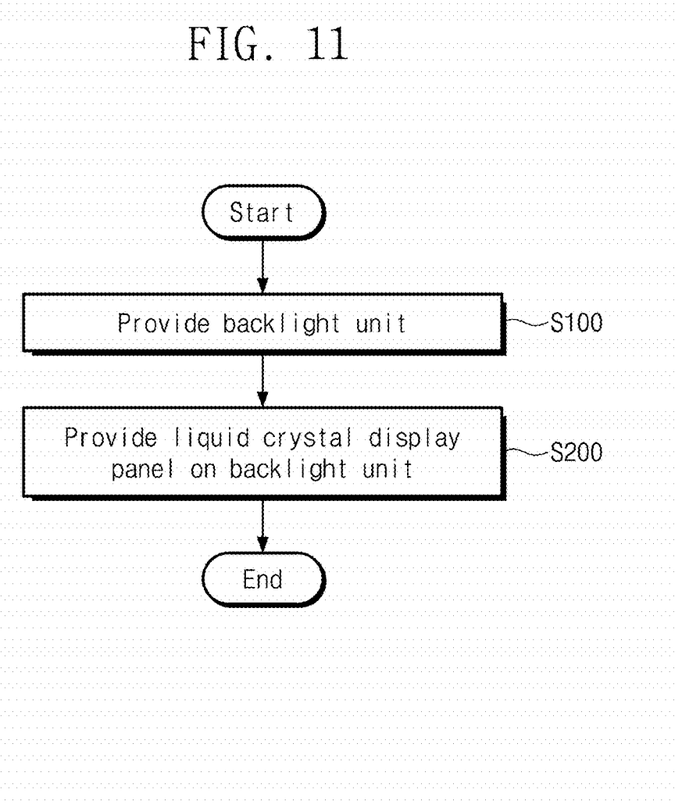
FIG. 11 is a flowchart illustrating a method for manufacturing a liquid crystal display device, according to an embodiment.

FIG. 11 is a schematic flowchart illustrating a method for manufacturing a liquid crystal display device according to an embodiment.

Referring to FIGS. 1, 3, and 11, the method for manufacturing a liquid crystal display device according to an embodiment includes providing the backlight unit BLU including the light source unit LU and the plurality of optical sheets OS1 to OS5 (S100) and providing the liquid crystal display panel DP on the backlight unit BLU (S200).

Figure 12:
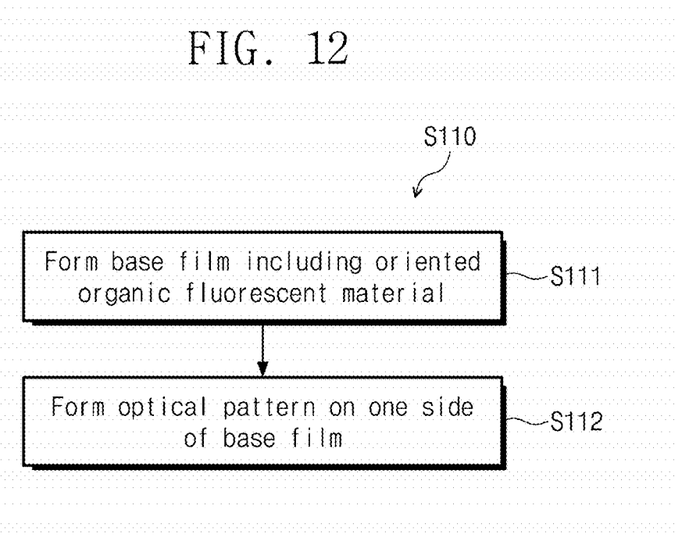
FIG. 12 is a flowchart illustrating a method of forming a polarizing optical sheet during a process of manufacturing a liquid crystal display device, according to an embodiment.

The backlight unit BLU (S100) is prepared by forming the polarizing optical sheet OS1 including the base film BF and the optical pattern OP formed on a surface of the base film BF, wherein at least one of the base film BF and the optical pattern OP includes the oriented organic fluorescent material OD (S110 of FIG. 12).

The providing of the liquid crystal display panel DP (S200) includes disposing the liquid crystal display panel DP on the backlight unit BLU such that the liquid crystal display panel DP is closest to the polarizing optical sheet OS1 amongst the optical sheets OS1 to OS5.

FIG. 12 is a schematic flowchart illustrating the forming of a polarizing optical sheet during a process of manufacturing a liquid crystal display device according to an embodiment.

Referring to FIGS. 1, 3, 11, and 12, the forming of the polarizing optical sheet OS1 (S110) may include forming the base film BF including the oriented organic fluorescent material OD (S111) and forming the optical pattern OP on one surface (e.g., one side) of the base film BF (S112).

Figure 13A:
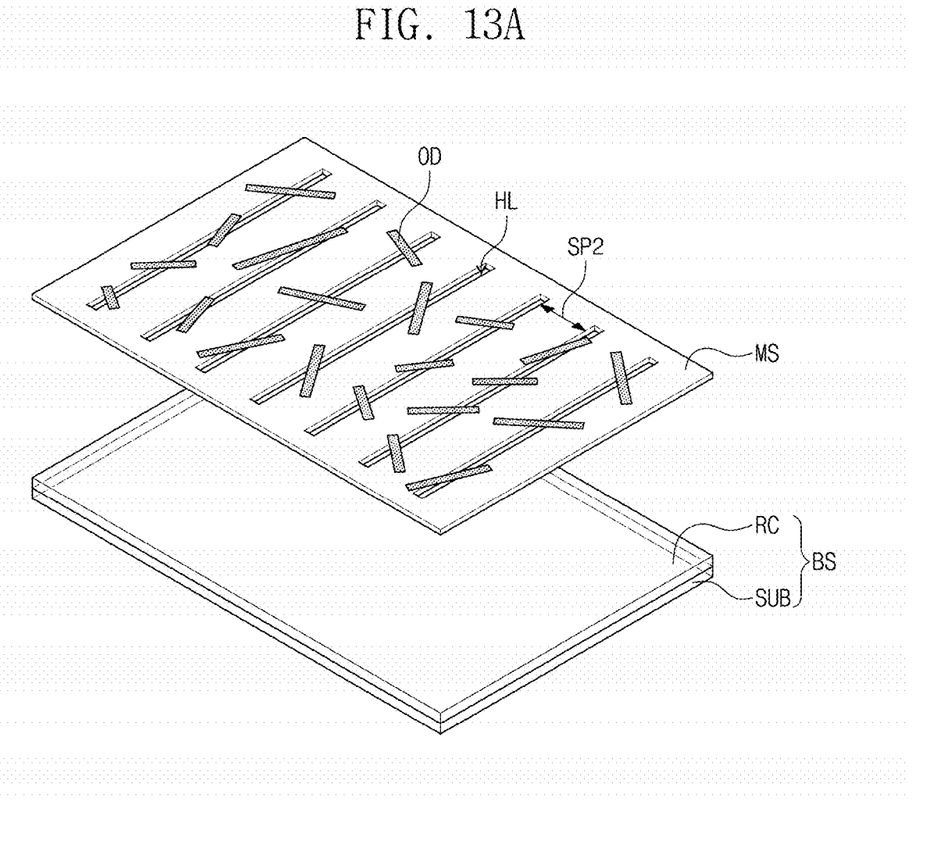
FIGS. 13A and 13B are schematic illustrations of a method of aligning an organic fluorescent material, according to an embodiment.
Figure 13B:
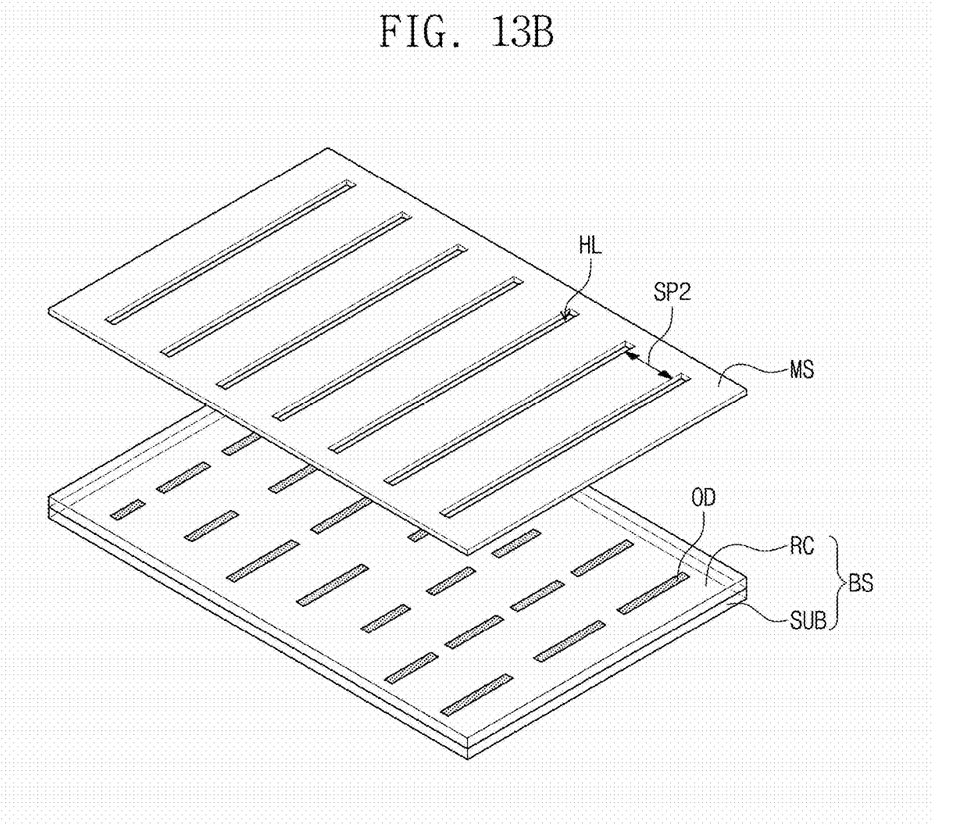

FIGS. 13A and 13B illustrate a method of orienting an organic fluorescent material according to an embodiment.

Referring to FIGS. 3, 12, 13A, and 13B, the forming the base film BF including the oriented organic fluorescent material OD (S111) may include providing a resin composition RC on a substrate SUB. In this case, the resin composition RC may not include the organic fluorescent material OD. The resin composition, for example, may include PET, but an embodiment is not limited thereto, and any suitable optical sheet material may be used. The resin composition RC, for example, may be applied on the substrate SUB.

Thereafter, an organic fluorescent material OD may be provided to the resin composition RC using a mask MS in which a plurality of openings HL are defined. The openings HL may be spaced apart from each other in the first direction DR1, and may extend in the second direction DR2 which is perpendicular to the first direction DR1. Each of the openings HL may be shaped like a long rod, but an embodiment is not limited thereto. Referring to FIG. 13B, the organic fluorescent material OD may pass through the opening HL and may be aligned in a first direction in the resin composition RC.

A distance of separation SP2 between the openings HL may be variously adjusted as desired, for example, may be several hundred of nanometers or several micrometers. The separation distance SP2 in the first direction DR1 between the openings HL, for example, may be 10 µm or less, and when this range is satisfied, the organic fluorescent material may be densely arranged in the resin composition so as to reduce the amount of light not absorbed by the organic fluorescent material.

Thereafter, the resin composition RC provided with the organic fluorescent material OD may be cured (hardened). The curing (hardening), for example, may include irradiating the resin composition with ultraviolet light.

Figure 14:
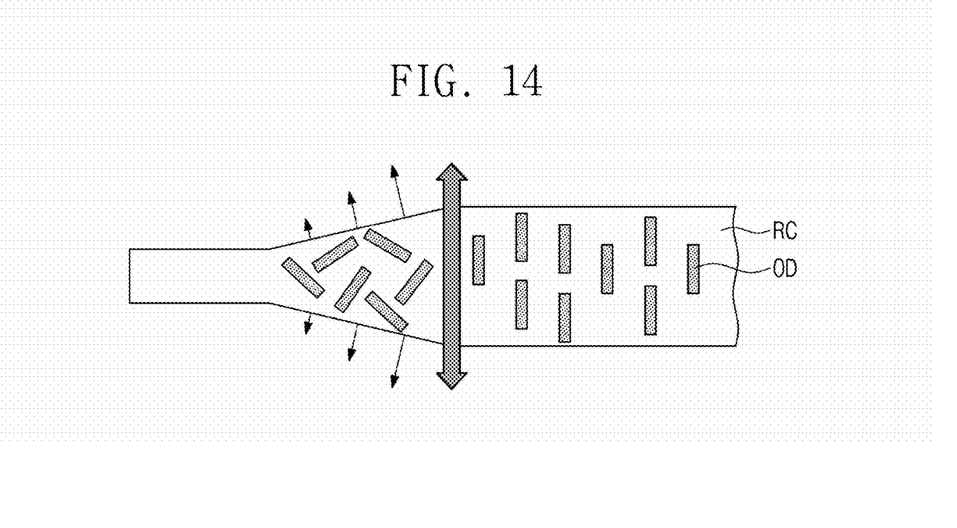
FIG. 14 is a schematic illustration of a method of aligning an organic fluorescent material, according to an embodiment.

FIG. 14 illustrates a method of orienting an organic fluorescent material according to an embodiment.

Referring to FIGS. 3, 12, and 14, the forming the base film BF including the oriented organic fluorescent material OD (S111) may include forming the base film BF by curing the resin composition RC including the organic fluorescent material OD. The resin composition RC may include the organic fluorescent material OD in an amount of from at least about 0.1 wt % to less than about 100 wt % based on the total weight of the resin composition RC. After the curing, the organic fluorescent material OD in the base film BF may be in an irregularly dispersed state. Thereafter, the base film BF may be stretched to orient (i.e., align) the organic fluorescent material OD in a predetermined direction. The stretching may be performed using a typical method known in the art.

Figure 15:
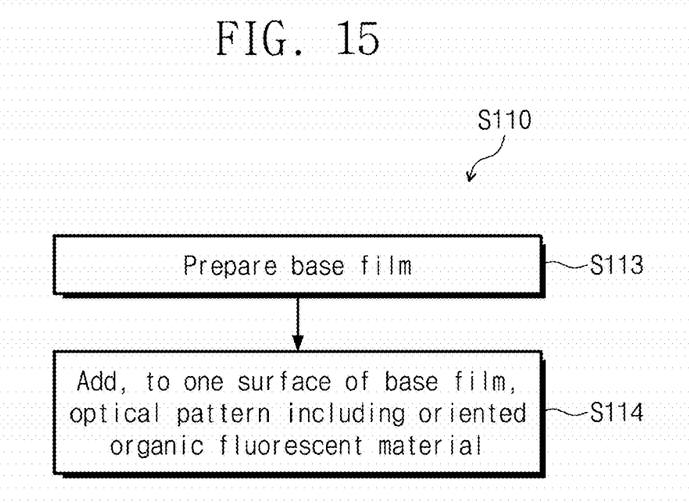
FIG. 15 is a flowchart illustrating a method of forming a polarizing optical sheet during a process of manufacturing a liquid crystal display device according to an embodiment.

FIG. 15 is a schematic flowchart illustrating forming of a polarizing optical sheet during a process of manufacturing a liquid crystal display device according to an embodiment.

Referring to FIGS. 1, 3, 11, and 15, the forming the polarizing optical sheet OS1 (S110) may include preparing the base film BF (S113) and forming the optical pattern OP including the oriented organic fluorescent material OD on one surface of the base film BF (S114).

The preparing of the base film BF (S113) may include providing a commercial base film BF or curing the resin composition RC.

Figure 16:
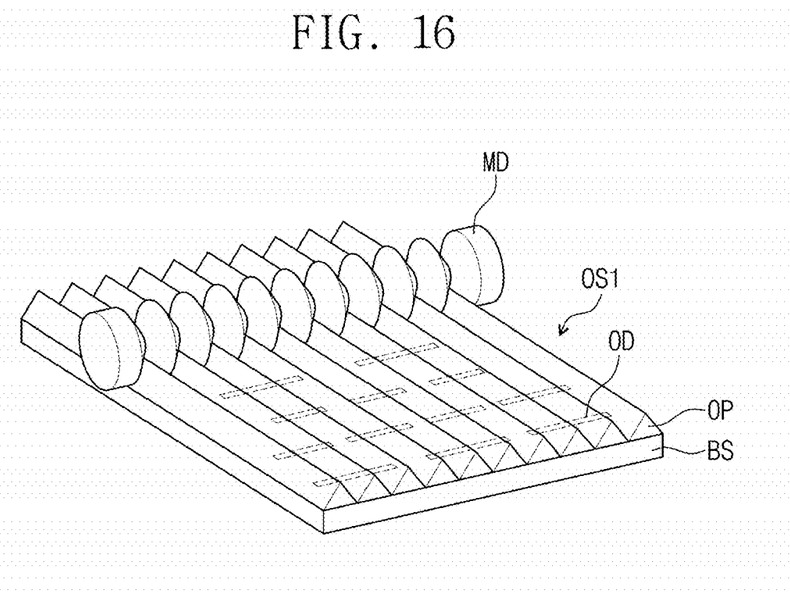
FIG. 16 is a schematic illustration of a method of forming an optical pattern, according to an embodiment.

FIG. 16 illustrates a method of forming an optical pattern according to an embodiment.

Referring to FIGS. 1, 3, 15, and 16, the forming the optical pattern OP on one surface of the base film BF (S114) may include using a mold MD in which a shape corresponding to the optical pattern OP is formed to define the pattern in the surface of the base film BF. However, an embodiment is not limited to the above-mentioned example, and the forming may be performed using other suitable methods.

The forming the optical pattern OP on the surface of the base film BF (S114) may include providing the resin composition RC including the organic fluorescent material OD having a polarity on the surface of the base film BF, and orienting the organic fluorescent material OD by applying at least one selected from an electric field and a magnetic field to the resin composition RC. After orienting the organic fluorescent material OD, the resin composition RC may be cured.

The forming the polarizing optical sheet (S110) is not limited to the above description. For example, the polymeric base film BF may be formed first, and then the base film BF may be dipped into a solution including the organic fluorescent material OD, and then the organic fluorescent material OD may be oriented through stretching, rolling, or the like.

Referring to FIGS. 6 and 11, the method for manufacturing a liquid crystal display device according to an embodiment may further include preparing the liquid crystal display panel DP including the first substrate DS1, the second substrate DS2 disposed on the first substrate DS1, the polarizing plate POL disposed on the second substrate DS2, and the liquid crystal layer LCL disposed between the first substrate DS1 and the second substrate DS2 prior to the providing of the liquid crystal display panel DP on the backlight unit BLU (S200). The method of preparing the liquid crystal display panel DP according to an embodiment does not include disposing a polarizing plate under the first substrate DS1, unlike a method of preparing a liquid crystal display panel of the prior art.

Referring to FIGS. 1 and 11, the providing the liquid crystal display panel DP on the backlight unit BLU (S200) may include disposing the first substrate DS1 such that the first substrate DS1 is closer to the backlight unit BLU than the second substrate DS2. In the providing of the liquid crystal display panel DP on the backlight unit BLU (S200), the liquid crystal display panel DP is disposed such that the polarizing optical sheet OS1 amongst the optical sheets OS1 to OS5 is closest to the liquid crystal display panel DP.

The method for manufacturing a liquid crystal display device according to an embodiment may further include additional operations suitable for the preparation of a liquid crystal display device.

The method for manufacturing a liquid crystal display device according to an embodiment may provide a liquid crystal display device having excellent luminous efficiency and high luminance. Furthermore, the method for manufacturing a liquid crystal display device according to an embodiment may provide a liquid crystal display device in which a lower polarizing plate of a liquid crystal display panel is not present. Moreover, the method for manufacturing a liquid crystal display device according to an embodiment may provide a liquid crystal display device having relatively lower power consumption.

The liquid crystal display device according to an embodiment employs a backlight unit including a polarizing optical sheet so that the amount of polarized light provided to a liquid crystal display panel may be increased, thereby improving a transmittance and a luminance.

Furthermore, the liquid crystal display device according to an embodiment has the effect of lower power consumption.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A liquid crystal display device comprising:
   a backlight unit; and
   a liquid crystal display panel disposed on the backlight unit,
   wherein the backlight unit comprises:
      a light source unit; and
      a plurality of optical sheets,
      wherein an optical sheet closest to the liquid crystal display panel among the plurality of optical sheets is a polarizing optical sheet and comprises:
      a base film; and
      an optical pattern disposed on a surface of the base film,
      wherein at least one of the base film or the optical pattern comprises an aligned organic fluorescent material,
   wherein the liquid crystal display panel comprises:
      a first substrate;
      a second substrate disposed on the first substrate;
      a polarizing plate disposed on the second substrate; and
      a liquid crystal layer disposed between the first substrate and the second substrate,
      wherein the first substrate comprises an upper surface and a lower surface which are facing each other and the lower surface is an outer surface of the liquid crystal display panel, and
      wherein the polarizing optical sheet is an outer surface of the backlight unit and is adjacent to the lower surface of the first substrate,
      wherein the organic fluorescent material comprises a structure having a long axis and a short axis, wherein the long axis is aligned in a first direction and the short axis is aligned in a second direction, wherein the short axis of a first organic fluorescent material is spaced apart from the short axis of a second organic fluorescent material in the second direction so as to be arranged irregularly.

2. The liquid crystal display device of claim 1, wherein the optical pattern comprises the organic fluorescent material.

3. The liquid crystal display device of claim 1, wherein the base film comprises the organic fluorescent material.

4. The liquid crystal display device of claim 1, wherein the light source unit comprises an unpolarized light source.

5. The liquid crystal display device of claim 1, wherein the organic fluorescent material has a polarity.

6. A method for manufacturing a liquid crystal display device, the method comprising:
   providing a backlight unit comprising a light source unit and a plurality of optical sheets; and
   providing a liquid crystal display panel on the backlight unit,
   wherein the backlight unit comprises a polarizing optical sheet among the plurality of optical sheets, and comprising a base film and an optical pattern disposed on a surface of the base film, wherein at least one of the base film or the optical pattern comprises an aligned organic fluorescent material,
   wherein the liquid crystal display panel comprises:
      a first substrate;
      a second substrate disposed on the first substrate;
      a polarizing plate disposed on the second substrate; and
      a liquid crystal layer disposed between the first substrate and the second substrate,
      wherein the first substrate comprises an upper surface and a lower surface which are facing each other and the lower surface is an outer surface of the liquid crystal display panel, and
   wherein the providing of the liquid crystal display panel comprises disposing the liquid crystal display panel on the backlight unit such that the lower surface of the first substrate is directly adjacent to the polarizing optical sheet,
   wherein the organic fluorescent material comprises a structure having a long axis and a short axis, wherein the long axis is aligned in a first direction and the short axis is aligned in a second direction, wherein the short axis of a first organic fluorescent material is spaced apart from the short axis of a second organic fluorescent material in the second direction so as to be arranged irregularly.

7. The method of claim 6, wherein the polarizing optical sheet is prepared by:
   forming the base film comprising the aligned organic fluorescent material; and
   forming the optical pattern on the surface of the base film.

8. The method of claim 7, wherein the forming the base film comprising the aligned organic fluorescent material comprises:
   providing a resin composition on a substrate;
   providing an organic fluorescent material in the resin composition using a mask in which a plurality of openings are defined, wherein the plurality of openings are spaced apart from each other in a first direction and the plurality of openings extend in a second direction which is perpendicular to the first direction; and
   curing the resin composition provided with the organic fluorescent material.

9. The method of claim 7, wherein the forming the base film comprising the aligned organic fluorescent material comprises:
   curing a resin composition comprising an organic fluorescent material to form the base film; and
   stretching the base film to align the organic fluorescent material.

10. The method of claim 6, wherein the forming the polarizing optical sheet comprises:
    preparing the base film; and
    forming the optical pattern comprising the aligned organic fluorescent material on the surface of the base film.

11. The method of claim 10, wherein the forming the optical pattern comprises:
    providing a resin composition comprising an organic fluorescent material having a polarity on the surface of the base film;
    applying at least one selected from an electric field and a magnetic field to the resin composition to align the organic fluorescent material; and
    curing the resin composition.

12. The method of claim 6, further comprising preparing the liquid crystal display panel prior to the providing of the liquid crystal display panel on the backlight unit, wherein the liquid crystal display panel comprises a first substrate, a second substrate disposed on the first substrate, a polarizing plate disposed on the second substrate, and a liquid crystal layer disposed between the first substrate and the second substrate.

13. The method of claim 12, wherein the providing the liquid crystal display panel to the backlight unit comprises disposing the first substrate such that the first substrate is closer to the backlight unit than the second substrate.

14. The liquid crystal display of claim 1, wherein the optical pattern has a three-dimensional shape.

15. The liquid crystal display of claim 14, wherein the three-dimensional shape comprises a prism shape, a lenticular shape, or a combination thereof.

* * * * *